US011205280B2

United States Patent
Chan

(10) Patent No.: US 11,205,280 B2
(45) Date of Patent: Dec. 21, 2021

(54) TEXTURED PRINTING

(71) Applicant: KYOCERA Document Solutions, Inc., Osaka (JP)

(72) Inventor: Sam Chinh Co Tang Chan, Garden Grove, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 109 days.

(21) Appl. No.: 16/576,490

(22) Filed: Sep. 19, 2019

(65) Prior Publication Data

US 2021/0090283 A1    Mar. 25, 2021

(51) Int. Cl.
G06T 7/70       (2017.01)
G03G 15/22      (2006.01)
G06K 9/00       (2006.01)
G06T 7/62       (2017.01)

(52) U.S. Cl.
CPC .............. *G06T 7/70* (2017.01); *G03G 15/224* (2013.01); *G06K 9/00214* (2013.01); *G06T 7/62* (2017.01)

(58) Field of Classification Search
CPC ........... G06T 7/70; G06T 7/62; G03G 15/224; G06K 9/00214
See application file for complete search history.

(56) References Cited

U.S. PATENT DOCUMENTS

| 7,381,443 | B2* | 6/2008 | Konno | B41J 11/0015 427/146 |
| 2005/0068347 | A1 | 3/2005 | Inoue | |
| 2009/0285489 | A1* | 11/2009 | Kanoh | G06K 9/2054 382/190 |
| 2012/0156446 | A1* | 6/2012 | Brehm | B42D 25/328 428/195.1 |
| 2012/0189776 | A1* | 7/2012 | Robinson | G03G 15/55 427/265 |
| 2016/0271881 | A1* | 9/2016 | Bostick | B29C 70/70 |
| 2017/0274587 | A1 | 9/2017 | Hakkaku | |

FOREIGN PATENT DOCUMENTS

WO     2017029816 A2    2/2017

* cited by examiner

*Primary Examiner* — John B Strege
(74) *Attorney, Agent, or Firm* — W. Eric Webostad

(57) ABSTRACT

Methods relating generally to textured printing are disclosed. In a method, at least one object or object outline in an image is identified using an artificial intelligence engine. A sub image is generated for the at least one object or object outline. The image and the sub image are processed to convert into image information and associated position information for the sub image in relation to the image for textured printing. The image information and the position information are stored in a memory for the textured printing.

13 Claims, 10 Drawing Sheets

TEXTURED PRINTING

FIELD

The following description relates to printing. More particularly, the following description relates to textured printing.

BACKGROUND

Conventionally, in computer vision, image segmentation used to partition a digital image into multiple segments (sets of pixels, also known as super-pixels). Image segmentation may be used to locate objects and boundaries in images. Image segmentation may assign a label to every pixel in an image, where all pixels with the same label share certain characteristics.

SUMMARY

In accordance with one or more below described examples, a method relating generally to textured printing is disclosed. In such a method, at least one object in an image is identified using an artificial intelligence engine. A sub image is generated for the at least one object. The image and the sub image are processed to convert into image information and associated position information for the sub image in relation to the image for the textured printing. The image information and the position information are stored in a memory for the textured printing.

In accordance with one or more below described examples, another method relating generally to textured printing is disclosed. In such a method, at least one object outline in an image is identified using an artificial intelligence engine. A sub image is generated for the at least one object outline. The image and the sub image are processed to convert into image information and associated position information for the sub image in relation to the image for the textured printing. The image information and the position information are stored in a memory for the textured printing.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 4-1 is a pictorial flow diagram depicting an example of a cloud-based textured printing flow.

FIG. 4-2 is a pictorial flow diagram depicting another example of the cloud-based textured printing flow of FIG. 4-1.

FIG. 4-3 is a pictorial flow diagram depicting another example of the cloud-based textured printing flow of FIG. 4-2.

DETAILED DESCRIPTION

Figure 1:
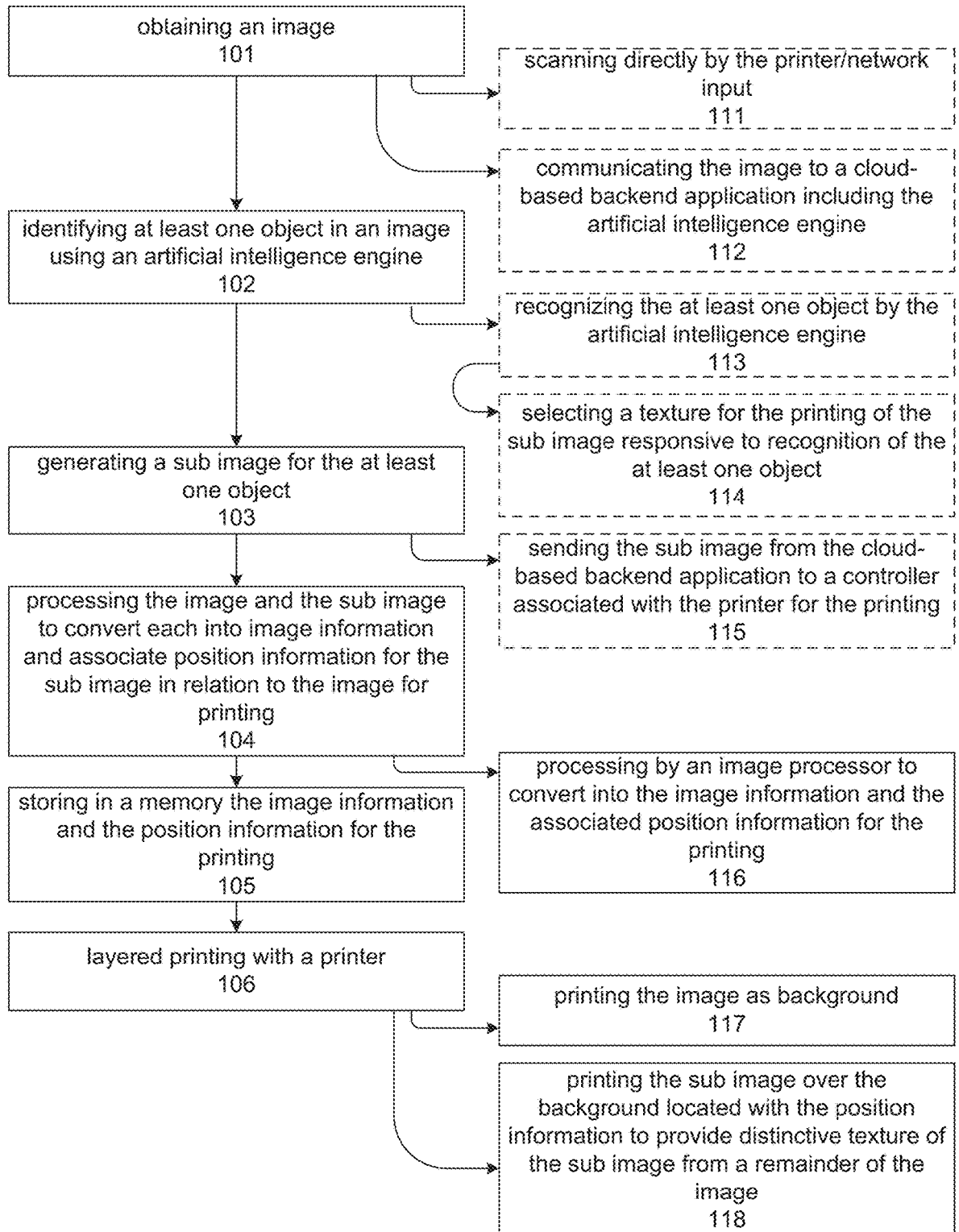
FIG. 1 is a flow diagram depicting an example of a textured printing flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A result of image segmentation may be a set of segments that collectively cover an image, or a set of contours extracted from an image. Each of the pixels in a region may be similar with respect to some characteristic or computed property, such as color, intensity, or texture. Adjacent regions may significantly different with respect to such characteristics.

As described below in additional detail, an artificial intelligence engine may be used to identify an object or an object outline in an image. A sub image may be generated for such object or object outline for printing or reprinting with respect to such image to provide a textured print result.

With the above general understanding borne in mind, various configurations for textured printing methods are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a flow diagram depicting an example of a textured printing flow 100. Textured printing flow 100 is for printing an object of an image more than once in order to provide a raised or three-dimensional look and feel of such object with respect to other portions of such image.

At operation 101, an image for printing may be obtained. Such an image may be directly input, such as by scanning into a scanner at optional operation 111, such as a scanner of a printer or other scanner, of operation 101. Such an image may be input over a network connection, whether wired or wireless, such as at optional operation 111. Furthermore, such an image may be loaded on to a memory stick and inserted. Accordingly, any of these or other image input operation may be used.

In another example, a mobile device may have an app configured for taking a picture to provide such an image for subsequent printing. A Software-as-a-Service (SaaS) backend application of a cloud-based computing system may be accessed, including wirelessly, from such mobile device app for printing such a picture with texture.

For purposes of clarity by way of example and not limitation, it shall be assumed an image is scanned into a printer at operation 101. However, again another type of image input operation may be used.

Furthermore, it is assumed such a printer, which in this example includes a scanning capability for obtainment of an image at operation 101, is in communication over a wired and/or wireless network with a cloud-based network. Along those lines, a printer may be a multi-function printer (MFP).

Such cloud-based network includes a backend application including an artificial intelligence ("AI") engine, including without limitation, access to an AI engine of such cloud-based network. Along those lines, an AI engine may be implemented in hardware, software, or a combination thereof. A known AI engine for object recognition is Google AI, such as a Vision API for example. However, other AI engine's may be used in other implementations.

Along those lines, optionally at operation 112 of operation 101 an image obtained may be communicated or uploaded to a cloud-based network for a cloud-based backend application, which in this example such cloud-based backend application includes an AI engine or an API to an AI engine of such cloud-based network. In another implementation, edge-based, rather than cloud-based, computing may be used.

Furthermore, in another example, a printer may be configured with such an AI engine. However, for purposes of clarity by way of non-limiting example, it is assumed that a cloud-based AI engine is used.

At operation 102, at least one object in an image may be identified using an AI engine. Along those lines, one or more objects in an image may be identified by an AI engine. Each such object may be a vector object or raster object, or another type of object.

Optionally at operation 113 of operation 102, at least one object may be recognized by an AI engine. It is possible that no object in an image is recognized by an AI engine, such as in for example a Jackson Pollock painting, and so this operation 113 is optional, as an outline of an object may be used as described below in additional detail. However, for purposes of clarity, it is assumed that at least one object is recognized in an obtained image.

For a recognized object, such as a horse for example, there may be one or more textures stored, which may vary by color for example. Storing various textures is a known technique in graphics processor units, and so is not described in unnecessary detail herein.

Optionally, at operation 114 of operation 102 for a recognized object, a texture for such an object may be selected. For the example of a horse, a horse skin texture may be selected for a horse. Furthermore, color and/or shading may be added responsive to appearance of such object in an image.

At operation 103, a sub image for such at least one object identified may be generated. This generation may be performed by such backend application by basically making a copy of such at least one object from such image. Such sub image may be a single object or multiple objects. Furthermore, such multiple objects may be layered with respect to one another.

An AI engine may be configured to determine which one or more objects are on top and so forth down to which one or more objects are background in an image. While a flat image has been assumed, an image may be a multi-layered imaged. For an example with a multi-layered image, an AI engine may select those one or more objects of a top layer in an image.

Furthermore, optionally a user may be given an opportunity to select one or more objects, including whether or not such objects are on top and so forth. A human intervention for object selection and layering may be used in conjunction with an AI engine.

After a sub image is generated for at least one object at operation 103, optionally such sub image may be sent from a cloud-based backend application to a controller, where such controller is associated with a printer for printing. Such a controller may be part of such a printer or may be external to such a printer. Such a controller may be in a computer used to control such printer, and such computer may be local or remote with respect to such printer. However, for purposes of clarity by way of non-limiting example, a controller of a printer is assumed for the following description.

At operation 104, an image obtained at 101 and a sub image, such as obtained from an AI engine, may be processed to convert each into image information and position information respectively. Such position information may be associated with location of a sub image in relation to an image for printing. While optionally at operation 103, an AI engine may provide coordinate information for a sub image using an image therefor as a map, and such coordinate information may be sent with a sub image at operation 115, in this example a pixel-to-pixel mapping is used.

Image information may be a conversion of a raster, vector, or other object into a bitmap for example by a controller to provide such bitmap as image information. Furthermore, pixel locations from such bitmap may further be position information for an identified object or generated object outline for placement in such bitmapped image.

Along those lines, a controller may convert an image and a sub image, which may include one or more objects having one or more layers, into respective bit maps. Associated position information may be generated by a controller for a pixel-to-pixel mapping of an image to sub image for example. In other words, an object may be mapped pixel for pixel to such object in an image for a pixel on corresponding pixel registration for subsequent printing.

In this example, such a controller includes an image processor for such processing at operation 116 of operation 104. As raster objects conventionally take more processing capability and time for processing, optionally such an image processor may include a raster image processor for processing one or more raster objects at operation 116.

At operation 105, image information and associated position information may be stored in memory for subsequent printing. In this example, such a controller includes memory, which in this example is cache memory, for subsequent printing.

At operation 106, a printer may layer print an image and a sub image. At operation 117 of operation 106, an image may first be printed as background or a first layer. After printing such image, at operation 118 of operation 106 a sub image may be printed as a second layer over such background image, including at least one object located with pixel position information to provide a distinctive raised texture of such sub image with respect to a remainder of such image. In another implementation, a reverse layering may be used for such layered printing. For example, at least one object of an image may be printed first, followed by printing an entirety of such image as a foreground image.

Figure 2:
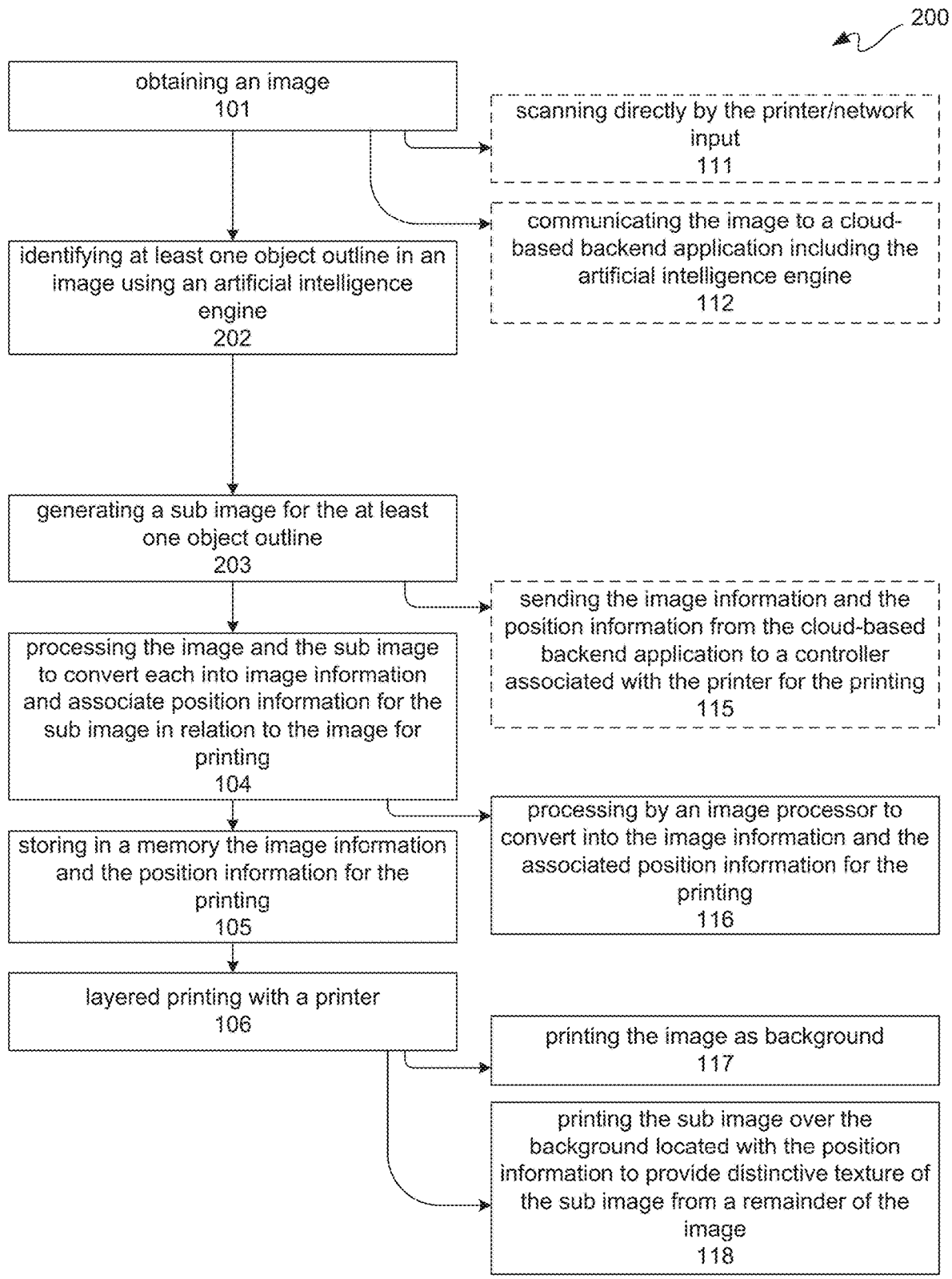
FIG. 2 is a flow diagram depicting an example of another textured printing flow.

It may be that no object is recognized at operation 102 or a user does not want to re-print an entire object, along either of those lines, an object outline may be printed. FIG. 2 is a flow diagram depicting an example of a textured printing flow 200. Textured printing flow 200 is for printing an object outline onto an object of an image in order to provide a raised or three-dimensional look and feel of such object outline with respect to other portions of such image. As much of the flows of FIGS. 1 and 2 are the same, some description is not repeated for purposes of clarity and not limitation.

At operation 101, an image for printing may be obtained, as previously described. Furthermore, optional operations 111 and/or 112 may likewise be performed as previously described.

At operation 202, at least one object outline in an image may be identified using an AI engine. Along those lines, one or more object outlines in an image may be identified by an AI engine. Each such object outline may be an outline of a vector object or raster object, or another type of object. In this instance, an object outline is used responsive to no object in an image being recognized by an AI engine; however, in another instance, a user may select use of an object outline rather than an object regardless of whether such object is recognized or not by an AI engine.

At operation 203, a sub image for such at least one object outline identified may be generated. This generation may be performed by such backend application by basically making generating at least one object outline from a corresponding at least one object in such image. Such sub image may be for a single object or multiple objects. Furthermore, such multiple objects may be layered with respect to one another, and so such object outlines may be correspondingly layered with respect to one another.

In another example a combination of objects and object outlines may be reprinted or printed, respectively. However, for purposes of clarity by way of non-limiting example, it is assumed that either objects or object outlines are printed.

An AI engine may be configured to determine which one or more objects are on top and so forth down to which one or more objects are background in an image. While a flat image has been assumed, an image may be a multi-layered imaged. For an example with a multi-layered image, an AI engine may select those one or more objects of a top layer for generation of corresponding object outlines.

Furthermore, optionally a user may be given an opportunity to select one or more objects, including whether or not such objects are on top and so forth, for outlining. A human intervention for object selection for outlining and layering may be used in conjunction with an AI engine.

After a sub image is generated for at least one object outline at operation 203, optionally such sub image may be sent from a cloud-based backend application to a controller, where such controller is associated with a printer for printing, as previously described with reference to operation 115.

At operation 104, an image obtained at 101 and a sub image, such as obtained from an AI engine, may be processed to convert each into image information and position information respectively, as previously described. In this example, such a controller includes an image processor for such processing at operation 116 of operation 104, as previously described.

At operation 105, image information and associated position information may be stored in memory for subsequent printing, as previously described. At operation 106, a printer may print an image and a sub image, as previously described. At operation 117 of operation 106, an image may first be printed as background, as previously described. After printing such image, at operation 118 of operation 106 a sub image may be printed over such background image, including at least one object located with pixel position information to provide a distinctive raised texture of such sub image with respect to a remainder of such image, as previously described. In another implementation, a reverse layering may be used, for example where at least one object outline is printed first, followed by printing an entirety of such image as a foreground image.

Figure 3:
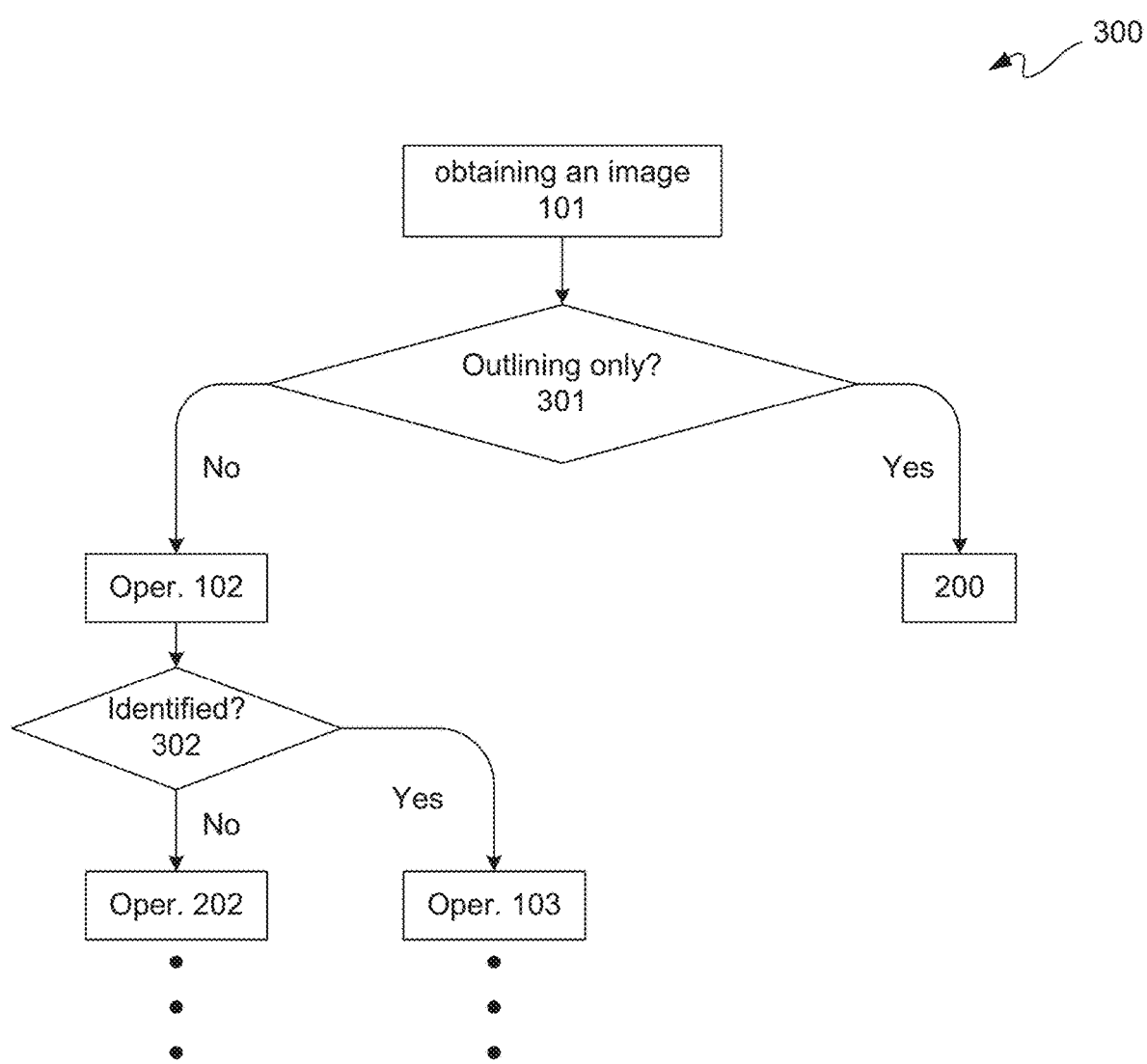
FIG. 3 is a flow diagram depicting an example of yet another textured printing flow.

FIG. 3 is a flow diagram depicting an example of a textured printing flow 300. Operation 101 may be performed as previously described and not repeated.

At operation 301, a check may be made to determine if generation of object outlines is to be exclusively performed. If, as determined at operation 301, only object outlining is to be used, a remainder of flow 200 follows. If, however, as determined at operation 301 both object outlining and object reprinting may be used, a remainder of each of flows 100 and 200 may be performed on an object-by-object identification basis responsive to operation 102, as follows.

If at operation 102 no object is identified as determined at operation 302, such object may be identified for outlining at operation 202, and a remainder of flow 200 follows. If, however, at operation 102 an object is identified as determined at operation 302, such identified object may be subsequently reprinted by using a remainder of flow 100.

Figures 1, 4:
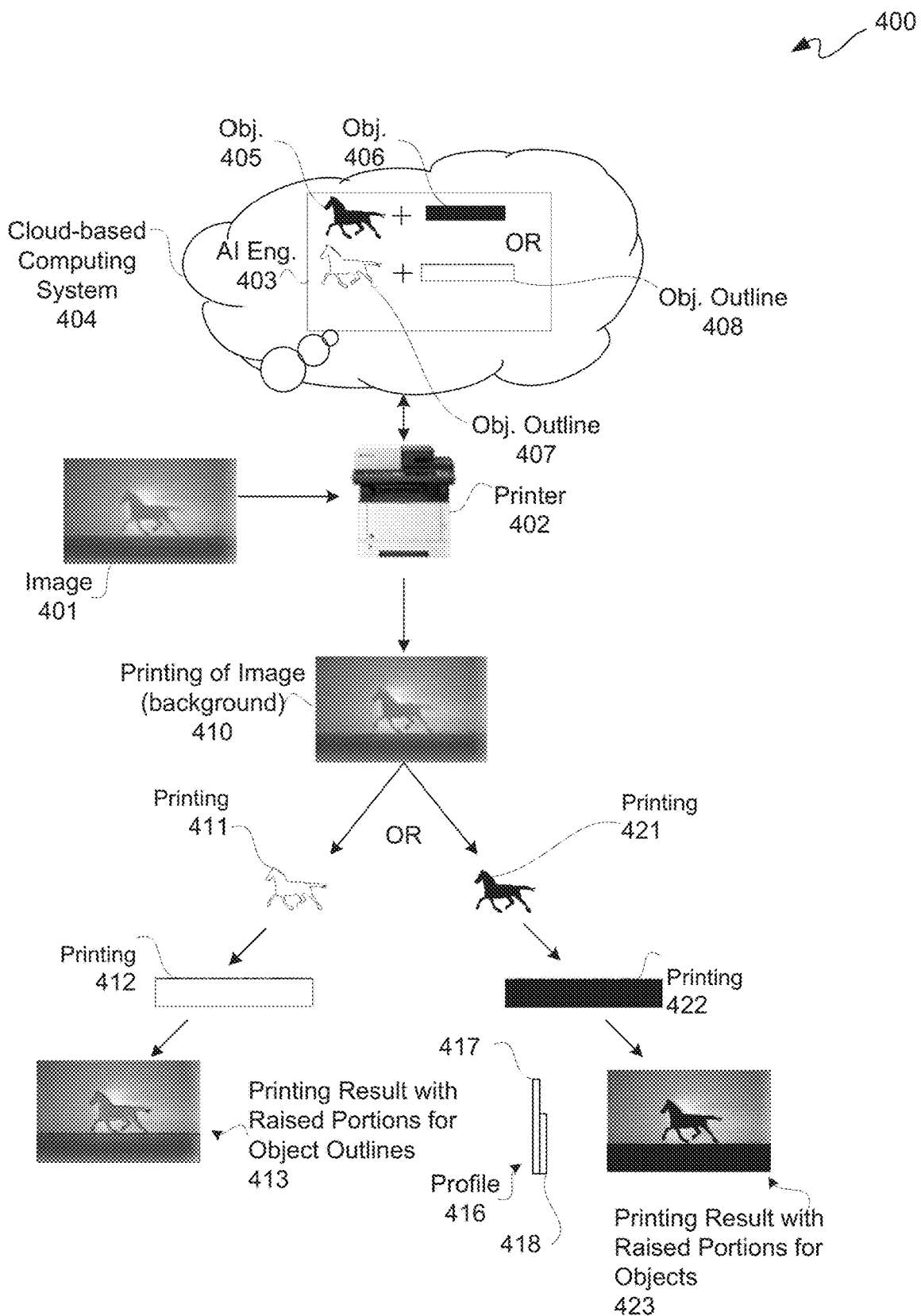
Figures 2, 4:
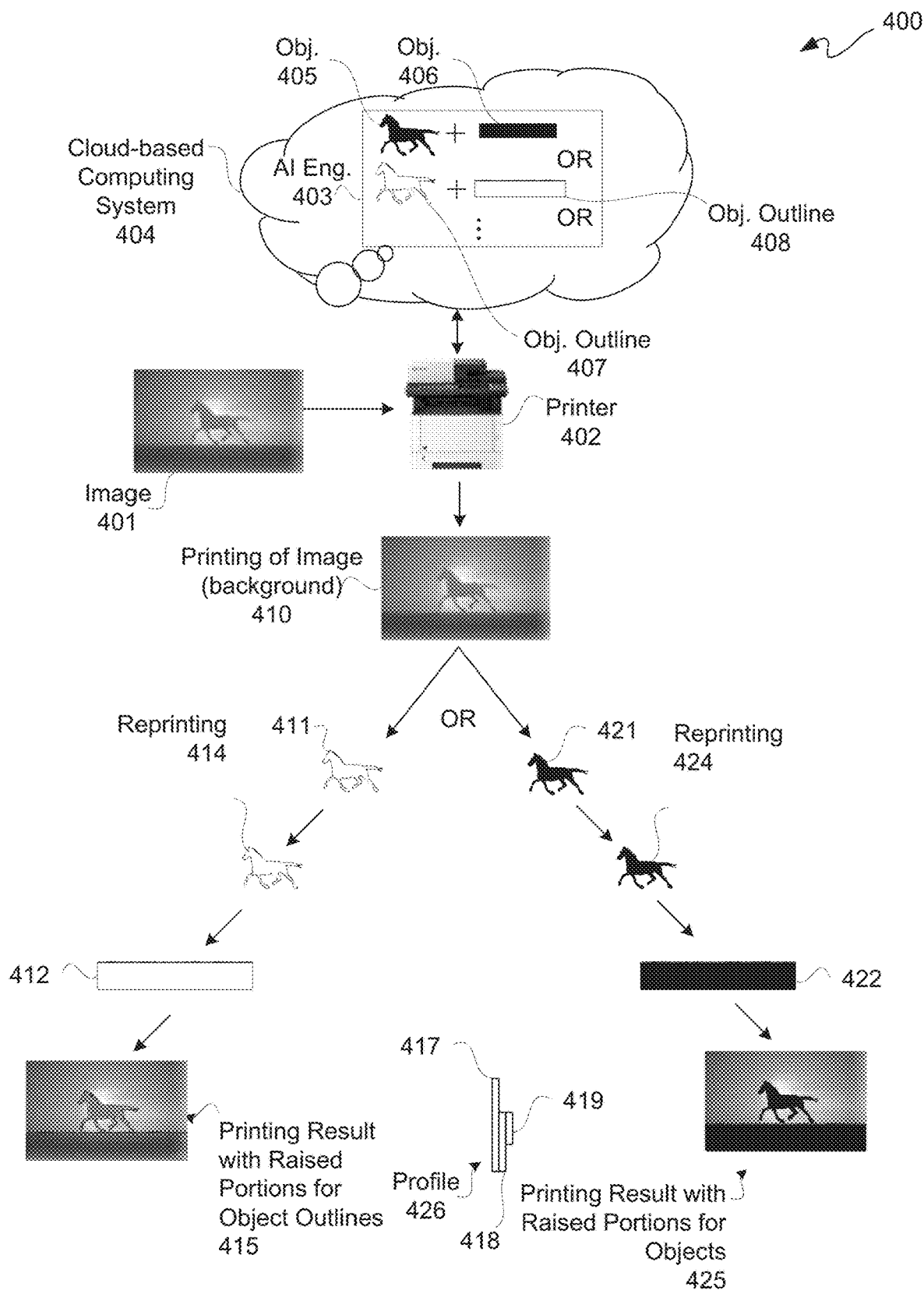
Figures 3, 4:
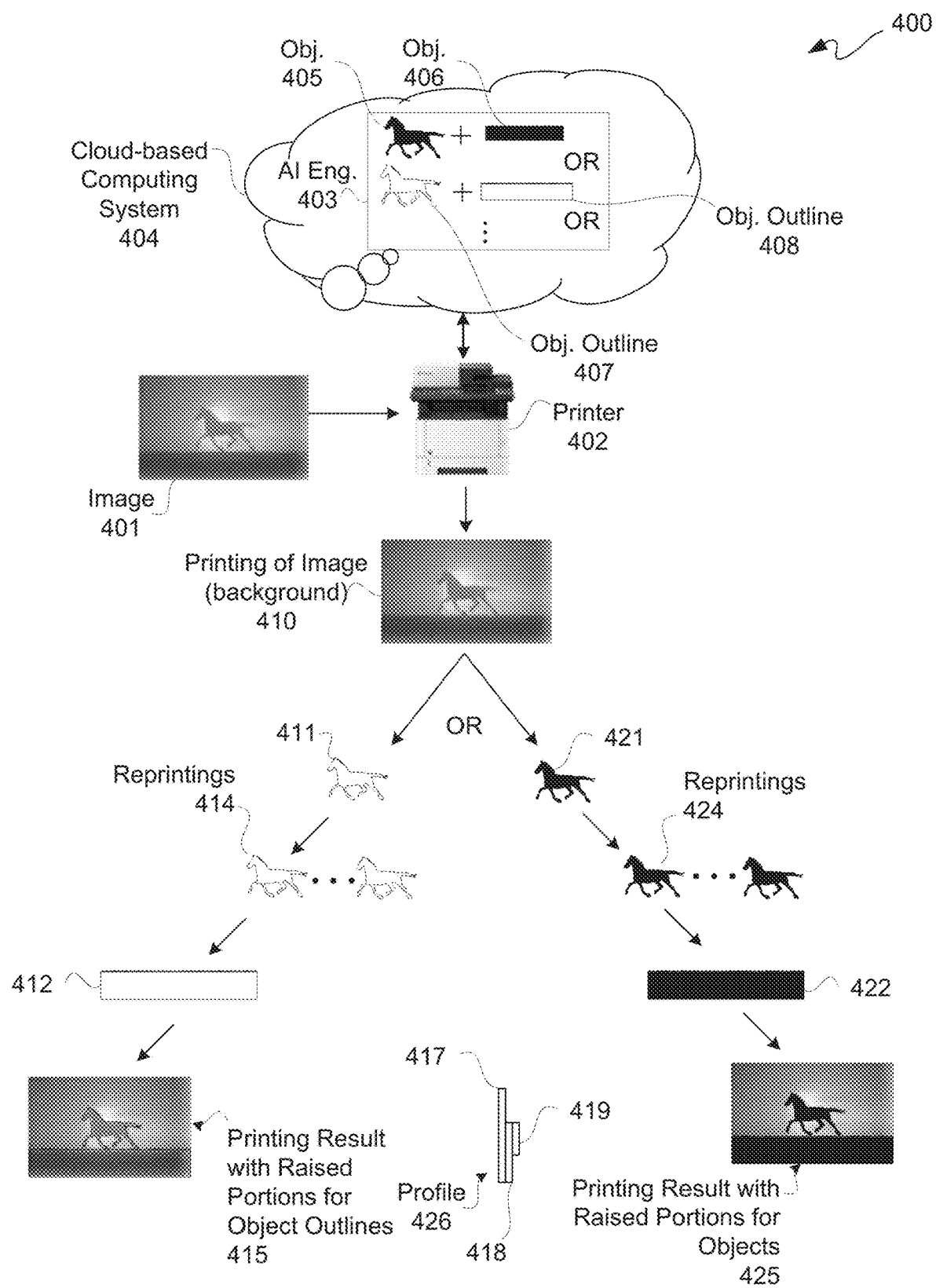

FIG. 4-1 is a pictorial flow diagram depicting an example of a cloud-based textured printing flow 400. An image 401, which in this example is a horse galloping on grass with a setting sun in the background, is provided to a printer 402.

Printer 402 communicates image 401 to a cloud-based computing system 404 having an AI engine 403. From image 401, AI engine 403 may identify a horse object 405 and a grass object 406 as raster objects. In another example, from image 401, AI engine 403 may generate a horse object outline 403 and a grass object outline 408. In this example objects 405 through 408 include raster objects and raster object outlines. However, in another example, vector objects and/or vector object outlines may be used.

One or more of objects 405 through 408 may be provided back to printer 402. In this example, it is assumed that printer 402 includes a controller, as described below in additional detail.

At operation 410, printer 402 may first print image 401 as background. Printer 402 may then print object outlines in sequence or objects in sequence or some other combination and/or sequence.

For an outline path (left path in the figure), printer 402 in this example first prints at printing operation 411 an object outline 407 onto background image 401 positioned to an object 405 of such background. In this example, printer 402 then prints at printing operation 412 an object outline 408 onto background image 401, and possibly onto portions of printed object outline 407, positioned to an object 406 of such background. An output of such printings may be a printing result 413 having raised portions for object outlines 407 and 408 on a background image 401.

For an object recognition path (right path in the figure), printer 402 in this example first prints at printing operation 421 an object 405 onto background image 401 positioned to such an object 405 of such background. In this example, printer 402 then prints at printing operation 422 an object 406 onto background image 401, and possibly onto portions of printed object 405, positioned to an object 406 of such background. An output of such printings may be a printing result 423 having raised portions for objects 405 and 406 on a background image 401.

In profile 416, printing results 413 and 423 may have a background print portion 417 and a raised print portion 418 with respect to background print portion 417.

FIG. 4-2 is a pictorial flow diagram depicting another example of a cloud-based textured printing flow 400. As much of textured printing flows 400 of FIGS. 4-1 and 4-2 are the same, generally only the differences are described below for purposes of clarity and not limitation.

For an outline path (left path in the figure), printer 402 in this example first prints at printing operation 411 an object outline 407 onto background image 401 positioned to an object 405 of such background. Then at printing operation 414, printer 402 reprints an object outline 407 onto a previously printed object outline 407. In this example, printer 402 then prints at printing operation 412 an object outline 408 onto background image 401, and possibly onto portions of printed object outlines 407 and 408, positioned to an object 406 of such background. An output of such printings may be a printing result 415 having raised portions for object outlines 407 and 408 on a background image 401.

For an object recognition path (right path in the figure), printer 402 in this example first prints at printing operation 421 an object 405 onto background image 401 positioned to such an object 405 of such background. Then at printing operation 424, printer 402 reprints an object 405 onto a previously printed object 405. In this example, printer 402 then prints at printing operation 422 an object 406 onto background image 401, and possibly onto portions of printed objects 405, positioned to an object 406 of such background. An output of such printings may be a printing result 425 having raised portions for objects 405 and 406 on a background image 401.

In profile 426, printing results 415 and 425 may have a background print portion 417, a raised print portion 418, and a double raise portion 419 with respect to background print portion 417.

Depending on user's preference, contents, and/or interpretation of objects, more layers may be printed. For example, FIG. 4-3 is a pictorial flow diagram depicting another example of cloud-based textured printing flow 400 of FIG. 4-2.

In this example of drawing a horse and grass, grass may be drawn with one layer, where an AI engine for example recognizes a raster object for grass as a layer and converts such raster object into a bitmap for example. However, a horse may be printed in more layers than grass in order to provide a more realistic depiction.

Even though example numbers of layers are depicted, other numbers of layers may be used in other examples. In this example, a horse may be drawn with five layers with four reprinting layers at reprinting operation 414 or 424. Moreover, if an even more realistic appearance is a goal, for example, the two legs in the background can be drawn with two reprinting layers at reprinting operation 414 or 424, but the two legs in the foreground can be drawn with four reprinting layers at reprinting operation 414 or 424 in order to indicate which two legs are in the background and which two legs are in the foreground.

Along the above lines, multiple layers of an object outline may be printed. Furthermore, multiple layers of an object may be printed, and such multiple layers may include such an object in its entirety or portions of such an object. In other words, an entire object may be printed in multiple layers, an entire object and portions thereof may be printed in multiple layers, portions of an object may be printed in multiple layers to form an entire object, or a combination of one or more of these.

Because one or more of the examples described herein may be implemented in using a network, such as for a cloud-based SaaS implementation, or a computing system, as well as a mobile device and an MFP, a detailed description of examples of each is provided. However, it should be understood that other configurations of one or more of these examples may benefit from the technology described herein.

Figure 5:
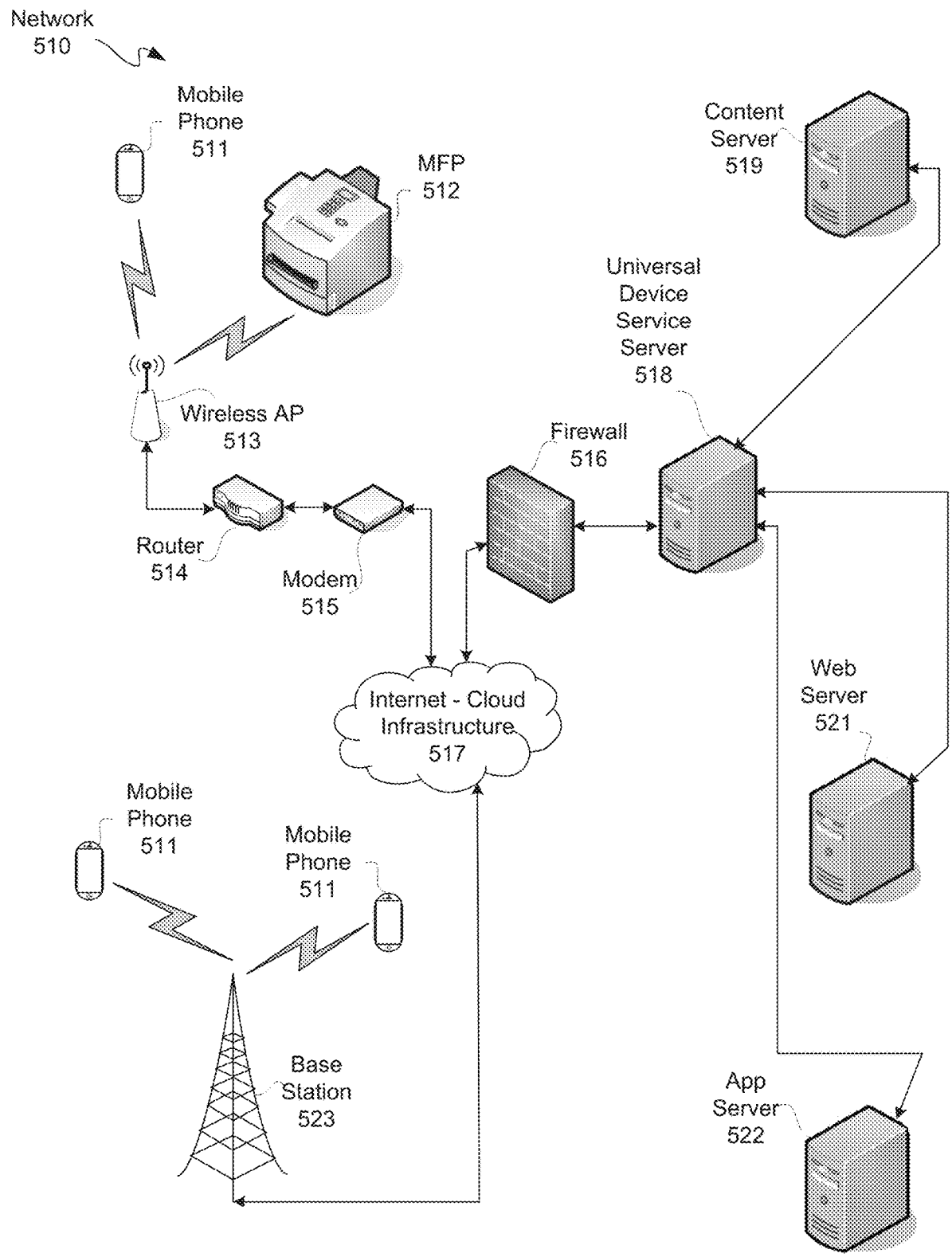
FIG. 5 is a pictorial diagram depicting an example of a network.

FIG. 5 is a pictorial diagram depicting an example of a network 510, which may be used to provide an SaaS platform for hosting a service or micro service for use by a user device, as described herein. Along those lines, network 510 may include one or more mobile phones 511, pads, notebooks, and/or other web-usable devices 511 in wired and/or wireless communication with a wired and/or wireless access point ("AP") 513 connected to or of a wireless router 514. Furthermore, one or more of such web-usable wireless devices 511 may be in wireless communication with a base station 523. Additionally, a desktop computer and/or an MFP 512, each of which may be web-usable devices, may be in wireless and/or wired communication to and from router 514. Even though an MFP 512 is depicted for example, in another example another type of printing device may be used.

Wireless AP 513 may be connected for communication with a router 514, which in turn may be connected to a modem 515. Modem 515 and base station 523 may be in communication with an Internet-Cloud infrastructure 517, which may include public and/or private networks.

A firewall 516 may be in communication with such an Internet-Cloud infrastructure 517. Firewall 516 may be in communication with a universal device service server 518. Universal device service server 518 may be in communication with a content server 519, a web server 524, and/or an app server 522. App server 522, as well as a network 510, may be used for downloading an app or one or more components thereof for accessing and using a service or a micro service as described herein for printing an image with texture.

Figure 6:
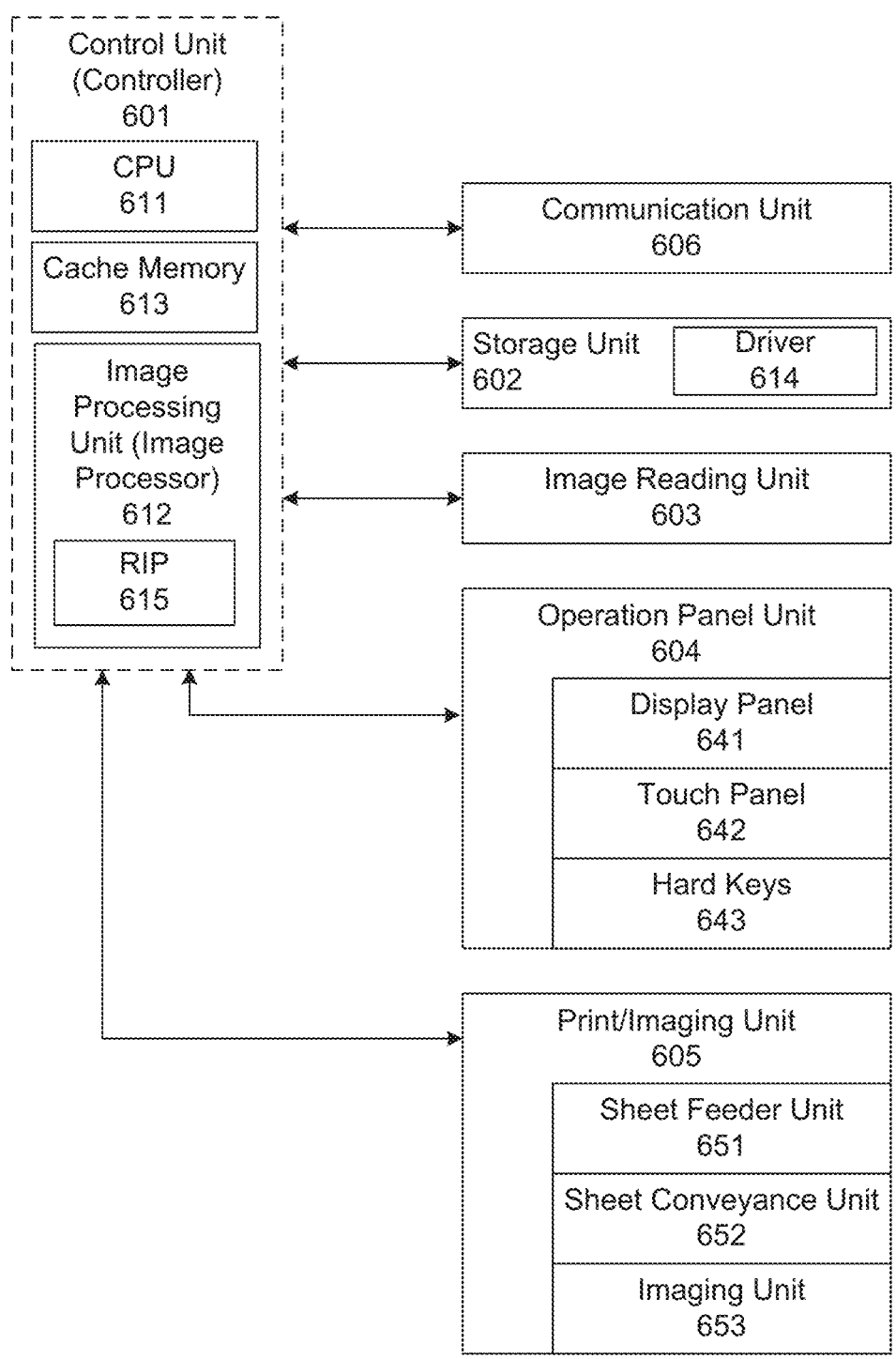
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example, as a base printer may be used in accordance with network input of an image independent of scanning using an MFP's scanner.

In this example, MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices. In another example, control unit 601 may optionally be separate from MFP 600.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614.

Control unit 601 may be a previously described controller for image and sub image processing at operation 104. Image processing unit 612 may be an image processor, and such image processor may include a raster image processor (RIP) 615. Cache memory 613 may be used to storing operation 105. Other memory, generally depicted as storage unit 602, may store a driver 614 for printer 600. Driver 614 may be configured with all or portions of flows described herein for texture printing.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
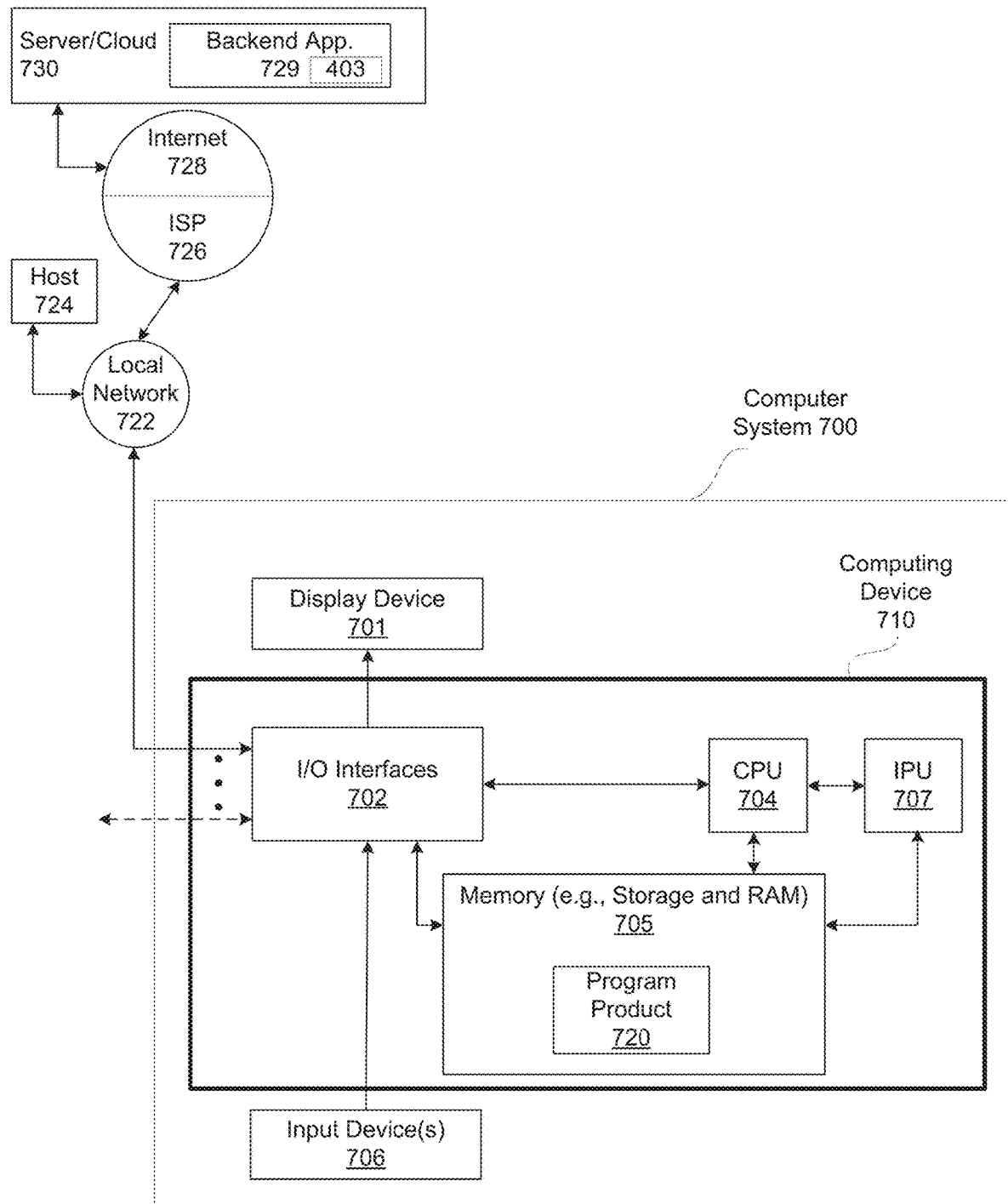
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707. Computing system 700 may be configured as a controller as described herein.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a printer, as well as a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infrared signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic and/or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

Internet server 730 may be a cloud-based server configured for SaaS. Server 730 may include a backend application 729 having an AI engine 403, as previously described herein.

Figure 8:
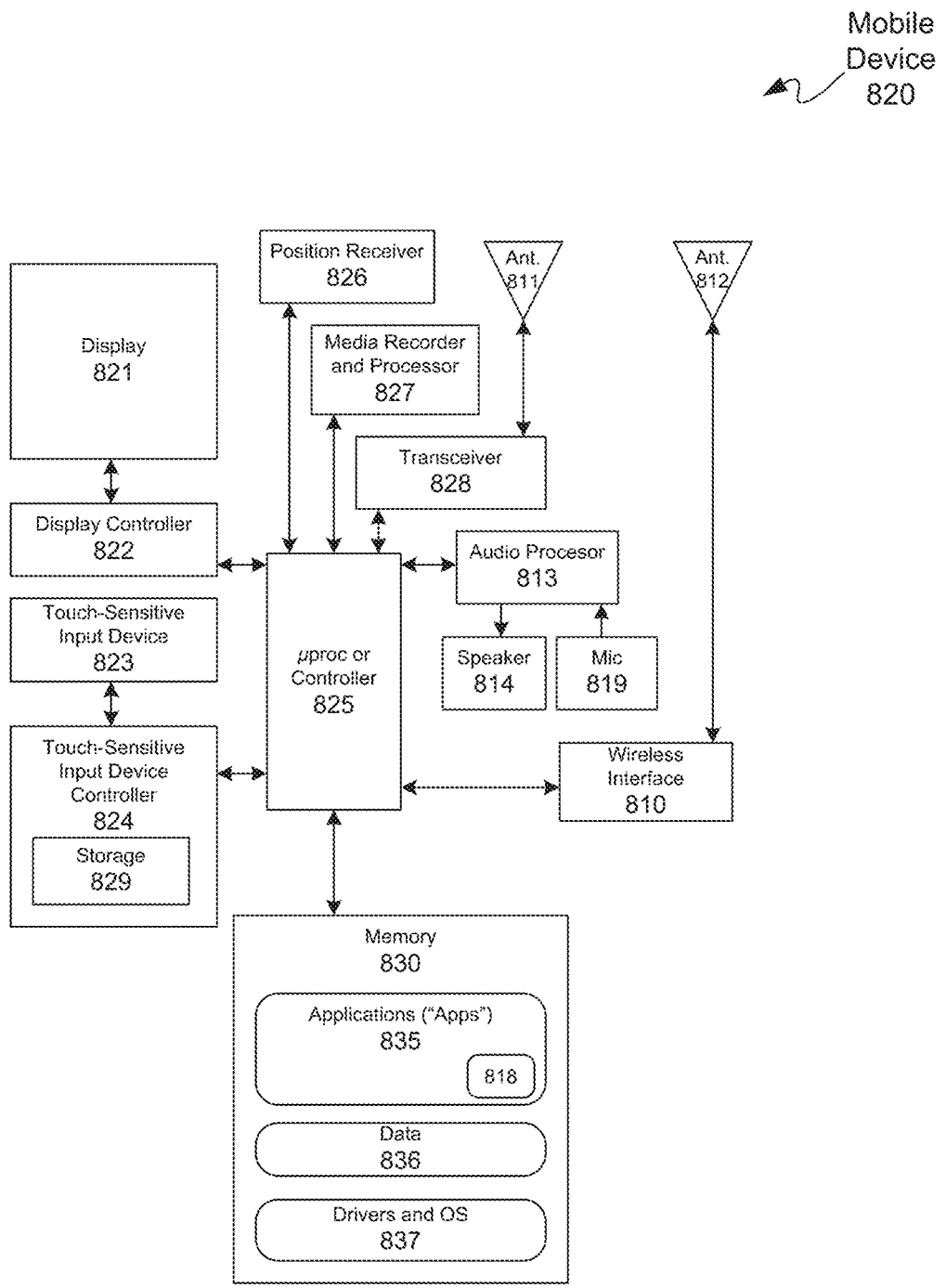
FIG. 8 is block diagram depicting an example of a portable communication device.

FIG. 8 is block diagram depicting an example of a portable communication device ("mobile device") 820. Mobile device 820 may be an example of a mobile device, as previously described, configured with an app 818 for textured printing as described herein.

Mobile device 820 may include a wireless interface 810, an antenna 811, an antenna 812, an audio processor 813, a speaker 814, and a microphone ("mic") 819, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 820. Microprocessor or microcontroller 825 may include a commercially available or custom microprocessor or microcontroller.

Memory 830 may be interconnected for communication with microprocessor or microcontroller 825 for storing programs and data used by mobile device 820. Memory 830 generally represents an overall hierarchy of memory devices containing software and data used to implement functions of mobile device 820. Data and programs or apps as described hereinabove may be stored in memory 830.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 820 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. Data may include application program data, such as an image, image objects, and object outlines.

I/O device drivers may include software routines accessed through microprocessor or microcontroller 825 or by an OS stored in memory 830. Apps, to communicate with devices such as the touch-sensitive input device 823 and keys and other user interface objects adaptively displayed on a display 821, may use one or more of such drivers.

Mobile device 820, such as a mobile or cell phone, includes a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor. Along those lines, touching activity input via touch-sensitive input device 823 may be communicated to touch-sensitive input device controller 824. Touch-sensitive input device controller 824 may optionally include local storage 829.

Touch-sensitive input device controller 824 may be programmed with a driver or application program interface ("API") for apps 835. An app may be associated with a service, as previously described herein, for use of a SaaS. One or more aspects of above-described apps may operate in a foreground or background mode.

Microprocessor or microcontroller 825 may be programmed to interface directly touch-sensitive input device 823 or through touch-sensitive input device controller 824. Microprocessor or microcontroller 825 may be programmed or otherwise configured to interface with one or more other interface device(s) of mobile device 820. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 820 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836, where images in such data 836 may be texture printed.

Mobile device 820 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones 819, for projecting and receiving sound, including without limitation recording sound, via mobile device 820. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 820 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output sound corresponding to audio data may be transferred from mobile device 820 to an adapter, another mobile radio terminal, a computer, or another electronic device. In another example, wireless interface 810 may be for communication within a cellular network or another Wireless Wide-Area Network (WWAN).

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   identifying at least one object in an image using an artificial intelligence engine;
   generating a sub image for the at least one object;
   processing the image and the sub image to convert into image information and associated position information for the sub image in relation to the image for textured printing;
   storing in a memory the image information and the position information for the textured printing;
   communicating the image to a cloud-based backend application including the artificial intelligence engine;
   recognizing the at least one object by the artificial intelligence engine;
   selecting a texture for the textured printing of the sub image responsive to recognition of the at least one object;
   sending the image information and the position information from the cloud-based backend application to a controller associated with a printer for the textured printing; and
   performing the textured printing with the printer, including:
      printing the image as background using color; and
      printing the sub image including the color over the background including the at least one object located with the position information to provide a distinctive raised texture by layering of the sub image with respect to the background.

2. The method according to claim 1, wherein:
   the printer is a multi-function printer; and
   the image is obtained by scanning by the printer.

3. The method according to claim 1, wherein the processing of the image and the sub image includes processing by an image processor to convert into the image information and the associated position information for the textured printing.

4. The method according to claim 3, wherein the image processor is of a controller having the memory.

5. The method according to claim 4, wherein the at least one object is a raster object.

6. The method according to claim 4, wherein the image processor includes a raster image processor.

7. The method according to claim 4, wherein the at least one object is a vector object.

8. A method, comprising:
   identifying at least one object outline in an image using an artificial intelligence engine;
   generating a sub image for the at least one object outline;
   processing the image and the sub image to convert into image information and associated position information for the sub image in relation to the image for textured printing;
   storing in a memory the image information and the position information for the textured printing;
   communicating the image to a cloud-based backend application including the artificial intelligence engine;
   recognizing the at least one object outline by the artificial intelligence engine;
   selecting a texture for the textured printing of the sub image responsive to recognition of the at least one object outline;

sending the image information and the position information from the cloud-based backend application to a controller associated with a printer for the textured printing; and performing the textured printing with the printer, including:

printing the image as background using color; and printing the sub image including the color over the background including the at least one object outline located with the position information to provide a distinctive raised texture by layering of the sub image outlined with respect to the background.

9. The method according to claim 8, wherein:

the printer is a multi-function printer; and the image is obtained by scanning by the printer.

10. The method according to claim 8, wherein the processing of the image and the sub image includes processing by an image processor to convert into the image information and the associated position information for the textured printing.

11. The method according to claim 10, wherein the image processor is of a controller having the memory.

12. The method according to claim 11, wherein the at least one object outline is a raster object outline.

13. The method according to claim 12, wherein the image processor includes a raster image processor.

\* \* \* \* \*